US012780070B2

(12) United States Patent
Faruque et al.

(10) Patent No.: US 12,780,070 B2
(45) Date of Patent: Nov. 3, 2026

(54) VEHICLE AIRBAG ASSEMBLY

(71) Applicant: Ford Global Technologies, LLC, Dearborn, MI (US)

(72) Inventors: Mohammad Omar Faruque, Ann Arbor, MI (US); S.M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 79 days.

(21) Appl. No.: 18/747,662

(22) Filed: Jun. 19, 2024

(65) Prior Publication Data

US 2025/0388162 A1 Dec. 25, 2025

(51) Int. Cl.
*B60N 3/00* (2006.01)
*B60R 21/20* (2011.01)
*B60R 21/231* (2011.01)

(52) U.S. Cl.
CPC ............ *B60N 3/002* (2013.01); *B60N 3/001* (2013.01); *B60R 21/20* (2013.01); *B60R 21/231* (2013.01)

(58) Field of Classification Search
CPC ......... B60N 3/002; B60R 21/16; B60R 21/23; B60R 21/231
See application file for complete search history.

(56) References Cited

U.S. PATENT DOCUMENTS 2,619,395 A 11/1952 Kent
3,650,223 A 3/1972 Kobori
3,985,374 A 10/1976 Powaska
4,040,692 A * 8/1977 Sass ...................... A47B 41/00 312/231
6,220,660 B1 4/2001 Bedro et al.
11,577,680 B1 2/2023 Faruque et al.
11,590,914 B1 * 2/2023 Llamazares Domper .................. B60N 2/0276
11,891,007 B1 2/2024 Smitterberg et al.
11,891,009 B1 2/2024 Smitterberg et al.
2018/0162253 A1 6/2018 Faruque et al.
2019/0144121 A1 5/2019 Young et al.
2020/0023801 A1 * 1/2020 Takemura ............. B60N 3/002
2021/0405710 A1 * 12/2021 Chuang ................ G06F 1/3231
2024/0092304 A1 3/2024 Jaradi et al.

FOREIGN PATENT DOCUMENTS

DE 19823141 C2 * 5/2000 ............ B60N 3/002
DE 102007052975 A1 5/2009
DE 102021111034 A1 11/2022
DE 102018215199 A1 3/2023

(Continued)

OTHER PUBLICATIONS

DE19823141 english translation (Year: 2000).*

*Primary Examiner* — Anne Marie Antonucci
*Assistant Examiner* — Nicholas Patrick Langhorne
(74) *Attorney, Agent, or Firm* — Frank A. MacKenzie; Brooks Kushman P.C.

(57) ABSTRACT

An assembly includes a tray table movable from a use position to a support position. The assembly includes an airbag inflatable to an inflated position. The airbag at the inflated position abuts the tray table at the support position. The assembly includes a stop movable to a deployed position. The stop at the deployed position restricts movement of the tray table at the support position.

15 Claims, 7 Drawing Sheets

(56) References Cited

FOREIGN PATENT DOCUMENTS

| | | | |
|---|---|---|---|
| EP | 0530819 | A1 | 3/1993 |
| EP | 3640092 | A1 | 4/2020 |
| GB | 2299016 | A | 9/1996 |
| WO | 9935002 | A1 | 7/1999 |
| WO | 03066382 | A1 | 8/2003 |

* cited by examiner

VEHICLE AIRBAG ASSEMBLY

BACKGROUND

A vehicle may include one or more airbags deployable during certain vehicle impacts to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

Figure 1:
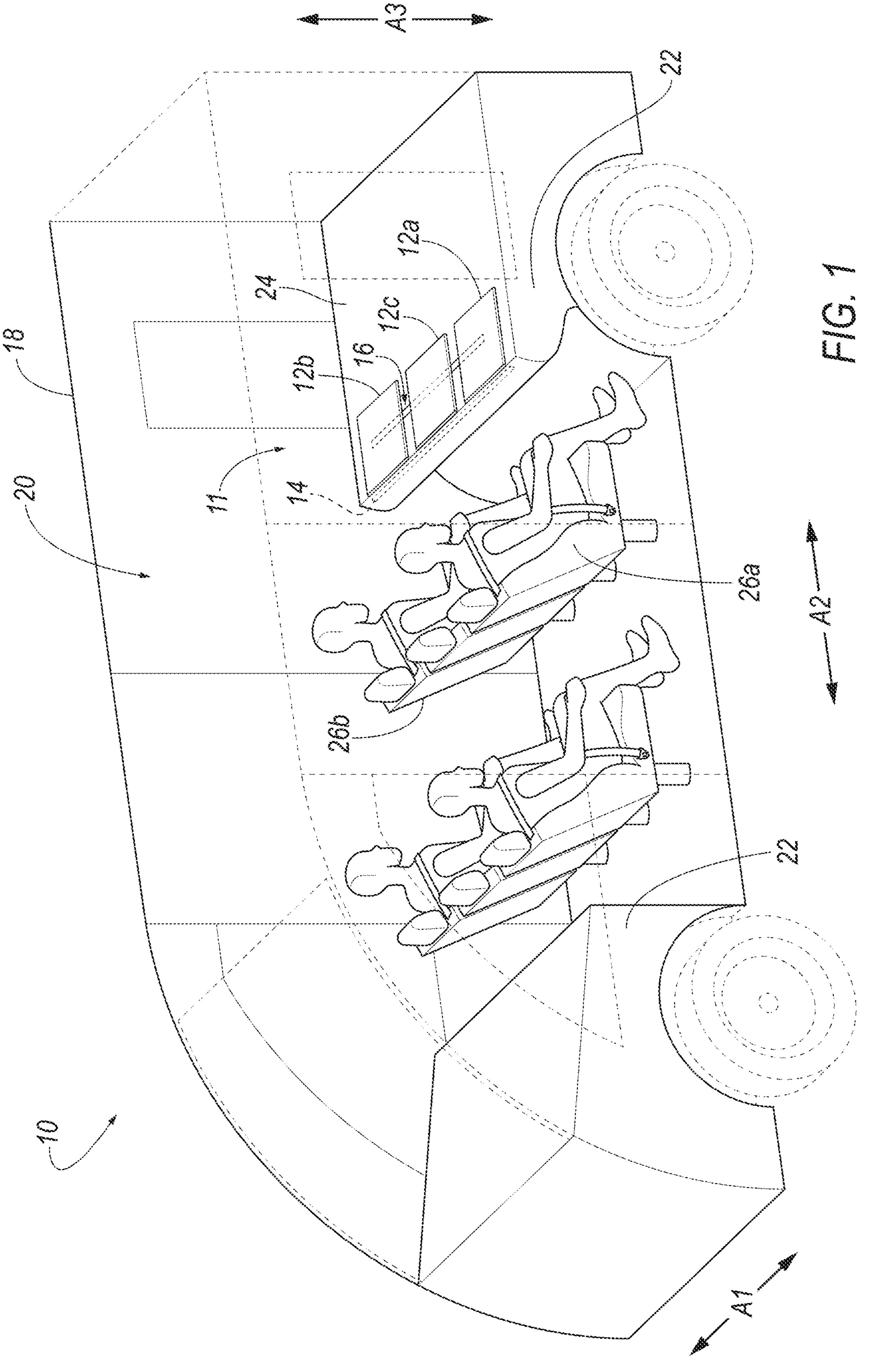
FIG. 1 is a perspective view of a vehicle having a plurality of tray tables at stowed positions and a stop at an undeployed position.

An assembly includes a tray table movable from a use position to a support position. The assembly includes an airbag inflatable to an inflated position. The airbag at the inflated position abuts the tray table at the support position. The assembly includes a stop movable to a deployed position. The stop at the deployed position restricts movement of the tray table at the support position.

The assembly may include a bulkhead. The tray table may be supported by the bulkhead.

The stop may be supported by the bulkhead.

The airbag may be supported by the bulkhead.

The airbag may be inflatable from an uninflated position to the inflated position. The airbag at the uninflated position may be below the tray table at the use position.

The stop may be movable from an undeployed position to the deployed position. The stop in the undeployed position may not restrict movement of the tray table at the support position.

The stop may include a wall. The wall at the deployed position may support the tray table at the support position.

The assembly may include a bulkhead. The wall may be movable from an undeployed position internal of the bulkhead to the deployed position external of the bulkhead.

The assembly may include a bulkhead. The wall at the deployed position may extend upward from the bulkhead.

The tray table may be movable from the use position to a stowed position.

The tray table at the support position may be between the use position and the stowed position.

The tray table may be rotatable from the stowed position to the use position and rotatable from use position to the stowed position.

The assembly may include an actuator operatively coupled to the stop to move the stop to the deployed position.

The assembly may include a computer in communication with the actuator. The computer may be programmed to command the actuator to move the stop to the deployed position in response to detecting a certain vehicle impact.

The assembly may include a seat. The tray table at the use position may be usable by an occupant of the seat.

The assembly may include a latch operable to maintain the stop at the deployed position.

The tray table may be upright at the support position.

The tray table may be sized to accommodate a personal electronic device.

The assembly may include a second tray table movable to a support position. The stop at the deployed position may restrict movement of the second tray table at the support position.

The stop may include a wall. The wall may extend from the tray table to the second tray table.

With reference to the Figures, wherein like numerals indicate like parts throughout the several views, a vehicle 10 with an assembly 11 for including a usable surface to an occupant and controlling kinematic of the occupant is shown. The assembly 11 includes a tray table 12*a*, 12*b*, 12*c* movable from a use position to a support position. The assembly 11 includes an airbag 14 inflatable to an inflated position. The airbag 14 at the inflated position abuts the tray table 12*a*, 12*b*, 12*c* at the support position. The assembly 11 includes a stop 16 movable to a deployed position. The stop 16 at the deployed position restricts movement of the tray table 12*a*, 12*b*, 12*c* at the support position.

With reference to FIG. 1, the vehicle 10 may be any suitable type of automobile, e.g., a passenger or commercial automobile such as a sedan, a coupe, a truck, a sport utility vehicle, a crossover vehicle, a van, a minivan, a taxi, a bus, etc.

The vehicle 10 defines a lateral axis A1 extending between a left-side and a right-side of the vehicle 10. The vehicle 10 defines a longitudinal axis A2 extending between a front and a rear of the vehicle 10. The vehicle 10 defines a vertical axis A3 extending between a top and a bottom of the vehicle 10. The lateral axis A1, the longitudinal axis A2, and the vertical axis A3 are perpendicular relative to each other.

The vehicle 10 includes a frame and the body 18. The body 18 may be of unitary construction, in which the frame is unitary with the body 18 including frame rails, rockers, pillars, roof rails, etc. As another example, the body 18 and frame may have a body-on-frame construction (also referred to as a cab-on-frame construction) in which the body 18 (including rockers, pillars, roof rails, etc.) and frame are separate components, i.e., are modular, and the body 18 is supported on and affixed to the frame. Alternatively, the frame and body 18 may have any suitable construction. The frame and the body 18 may be of any suitable material, for example, steel, aluminum, and/or fiber-reinforced plastic, etc. The body 18 defines the passenger cabin 20 to house occupants, if any, of the vehicle 10. The passenger cabin 20 may extend across the vehicle 10, i.e., from one side to the other side of the vehicle 10. The passenger cabin 20 includes a front end and a rear end.

In the example shown in the Figures, the body 18 includes a bulkhead 22 at the front end of the passenger cabin 20 and a bulkhead 22 may be at the rear end of the passenger cabin 20. In such an example, the bulkhead 22 at the front and the bulkhead 22 at the rear may be identical or different. The bulkhead 22 is elongated along the lateral axis A1. In other words, the bulkhead 22 may be longer along the lateral axis A1 than along the longitudinal axis A2 or the vertical axis A3. The bulkhead 22 may extend from a pillar on the right side of the vehicle 10 to a pillar on the left side of the vehicle 10. In other words, the bulkhead 22 may extend completely across the passenger cabin 20 along the lateral axis A1. The bulkhead 22 may extend from a floor of the passenger cabin 20 to the front windshield or rear windshield, e.g., along the vertical axis A3 of the vehicle 10. The bulkhead 22 may include an outer surface 24 that faces the passenger cabin 20. The outer surface 24 may be a class-A surface, i.e., a finished surface exposed to view by a customer and free of unaesthetic blemishes and defects.

One or more seats 26*a*, 26*b*, e.g., a first seat 26*a* and a second seat 26*b*, etc., may be supported in the passenger cabin 20. The seats 26*a*, 26*b* may be supported by the floor or other suitable structure of the vehicle 10. Each seat 26*a*, 26*b* may include a seatback and a seat bottom that can support an occupant of the seat 26*a*, 26*b*. For example, the occupant of the seat 26*a*, 26*b* may sit atop a top surface of the seat bottom and recline against the seatback. The seatback and the seat bottom may be adjustable in multiple degrees of freedom. Specifically, the seatback and the seat bottom may themselves be adjustable, in other words, adjustable components within the seatback and/or the seat bottom. The seats 26*a*, 26*b* may each rotate between a forward-facing position (toward the front end) and a rear-facing position (toward the rear end) and/or positions therebetween.

One or more tray tables 12*a*, 12*b*, 12*c* are included in the assembly 11 to provide support surfaces usable by an occupant of the vehicle 10. For example, the occupant may place one or more objects, such as papers, books, electronic devices, or the like, on the tray table 12*a*, 12*b*, 12*c* in the use position (shown in FIG. 2) and interact with such objects while seated in the vehicle 10. The tray table 12*a*, 12*b*, 12*c* may be sized to accommodate a personal electronic device, such as a tablet, laptop, etc. In other words, a surface 28 the tray table 12*a*, 12*b*, 12*c* in the use position available to the occupant may include sufficient area to support the personal electronic device thereon without further restraint of the personal electronic device by the occupant. The tray tables 12*a*, 12*b*, 12*c* may be metal, plastic, or any suitable material that provides sufficient strength and rigidity to enable use by the occupant.

The tray table 12*a*, 12*b*, 12*c* may be supported by the bulkhead 22. In other words, weight of the tray table 12*a*, 12*b*, 12*c* may be borne by the bulkhead 22. For example, the tray table 12*a*, 12*b*, 12*c* may be coupled to the bulkhead 22 with a hinge 30, track, or any other suitable structure. More than one tray table 12*a*, 12*b*, 12*c*, e.g., a first second tray table 12*a*, a second tray table 12*b*, and a third tray table 12*c*, may be supported by the bulkhead 22. The tray tables 12*a*, 12*b*, 12*c* may be arranged along the lateral axis A1. For example, the first tray table 12*a* may be in front of the first seat 26*a*, the second tray table 12*b* may be in front of the second seat 26*b*, and the third tray table 12*c* may be between the first tray table 12*a* and the second tray table 12*b* along the lateral axis A1. The tray table 12*a*, 12*b*, 12*c* may be supported by other suitable vehicle structure.

When not in use by an occupant, the tray table 12*a*, 12*b*, 12*c* may be at a stowed position, e.g., and as shown in FIG. 1. The tray table 12*a*, 12*b*, 12*c* at stowed position may be on top of the outer surface 24 of the bulkhead 22, e.g., laying flat on and generally parallel to the outer surface 24. As another example, the tray table 12*a*, 12*b*, 12*c* at the stowed position may be internal of the bulkhead 22 (not shown).

The tray table 12*a*, 12*b*, 12*c* may be movable from the stowed position to the use position and from the use position to the stowed position. The tray table 12*a*, 12*b*, 12*c* may be rotatable from the stowed position to the use position and may be rotatable from use position to the stowed position. For example, the tray table 12*a*, 12*b*, 12*c* may rotate about the hinge 30 coupling the tray table 12*a*, 12*b*, 12*c* to the bulkhead 22. The tray table 12*a*, 12*b*, 12*c* may be slidable from the stowed position to the use position and may be slidable from use position to the stowed position. For example, one or more tracks (not shown) may be fixed to the bulkhead 22. The tracks may be elongated along the longitudinal axis A2. The hinge 30 may be slidable along the tracks to move the tray table 12*a*, 12*b*, 12*c* from the stowed position to the used position, and vice vera. The tray table 12*a*, 12*b*, 12*c* may be coupled to the bulkhead 22 with any other suitable structure that enables movement of the tray table 12*a*, 12*b*, 12*c* relative to the bulkhead 22.

Figure 2:
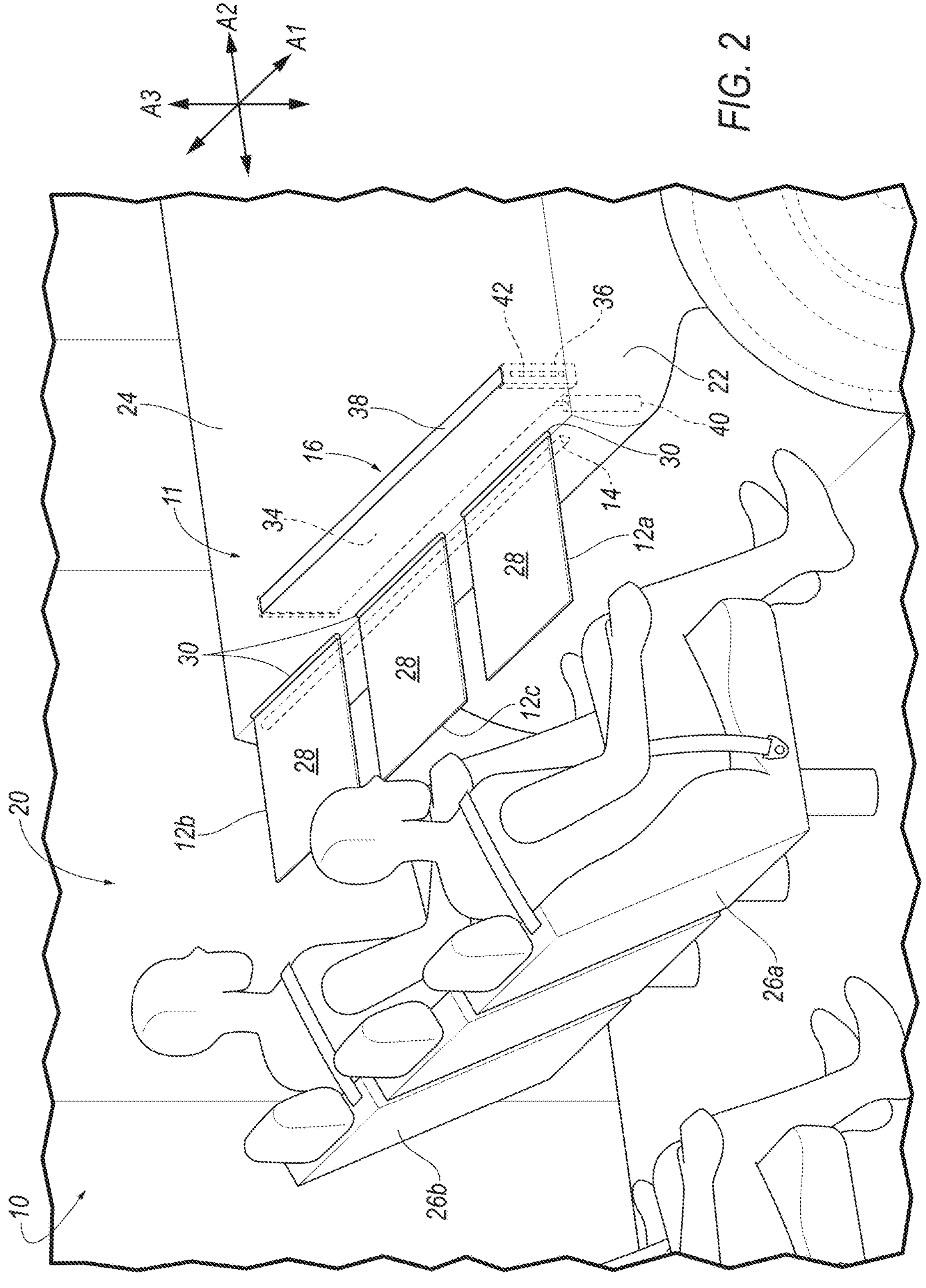
FIG. 2 is a perspective view of a portion of the vehicle with the plurality of tray tables at use positions and the stop at the undeployed position.

The tray table 12*a*, 12*b*, 12*c* at the use position is shown in FIG. 2. The tray table 12*a*, 12*b*, 12*c* at the use position is usable by an occupant of one of the seats 26*a*, 26*b* of the vehicle 10. For example, the surface 28 of the tray table 12*a*, 12*b*, 12*c* at the use position may be within arm's length of the occupant of the seat 26*a*, 26*b* and with no other structures of the vehicle 10 blocking access by the occupant to the surface 28. The tray table 12*a*, 12*b*, 12*c* may extend from the bulkhead 22 toward the seat 26*a*, 26*b*, e.g., along the longitudinal axis A2. The tray table 12*a*, 12*b*, 12*c* is movable from the use position to the support position. The tray table 12*a*, 12*b*, 12*c* may be rotatable from the use position to the support position. For example, the tray table 12*a*, 12*b*, 12*c* may rotate about the hinge 30 from the use position to the support position.

Figure 3:
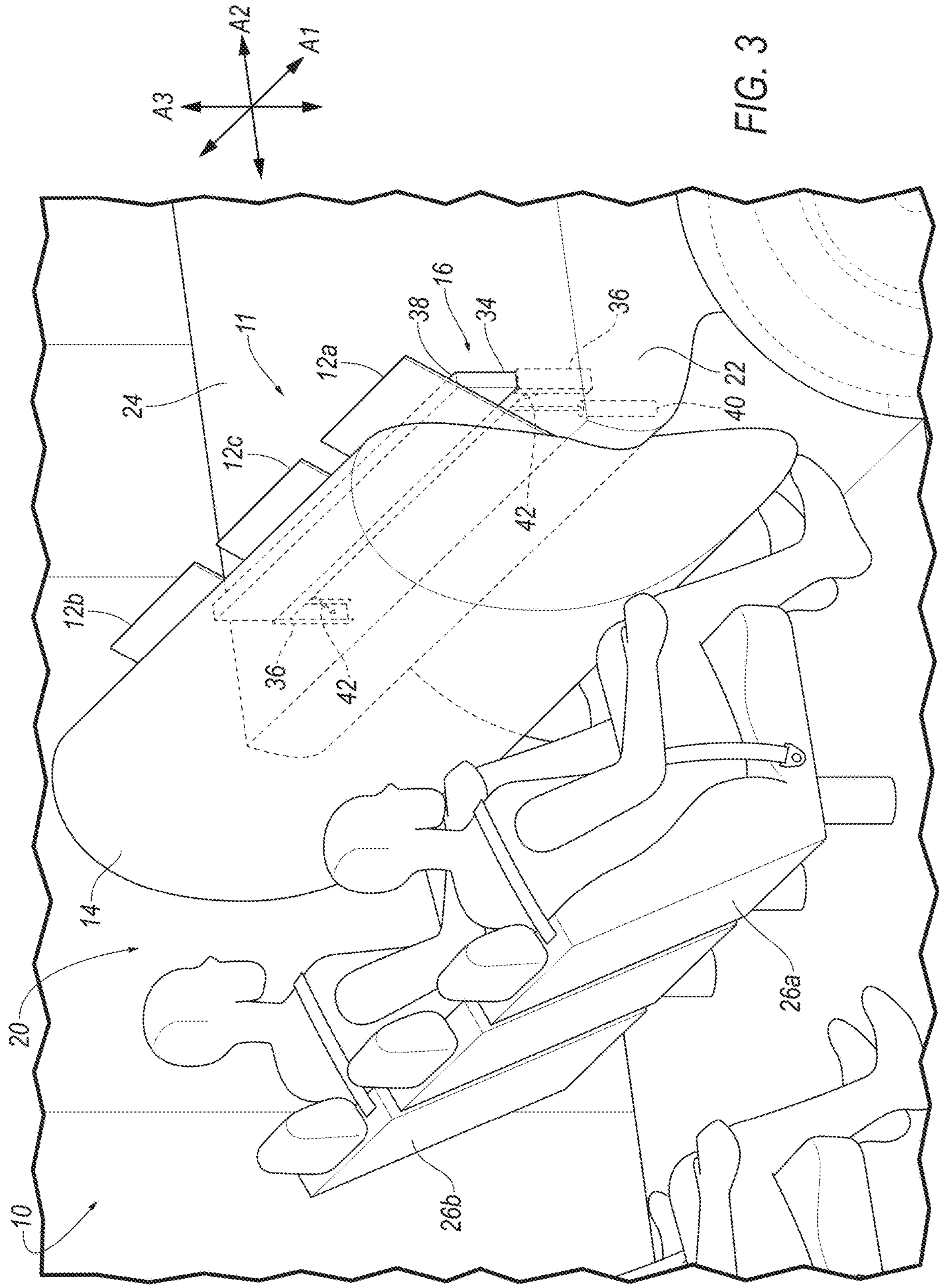
FIG. 3 is a perspective view of the portion of the vehicle with the plurality of tray tables at support positions and the stop at a deployed position.
Figure 4:
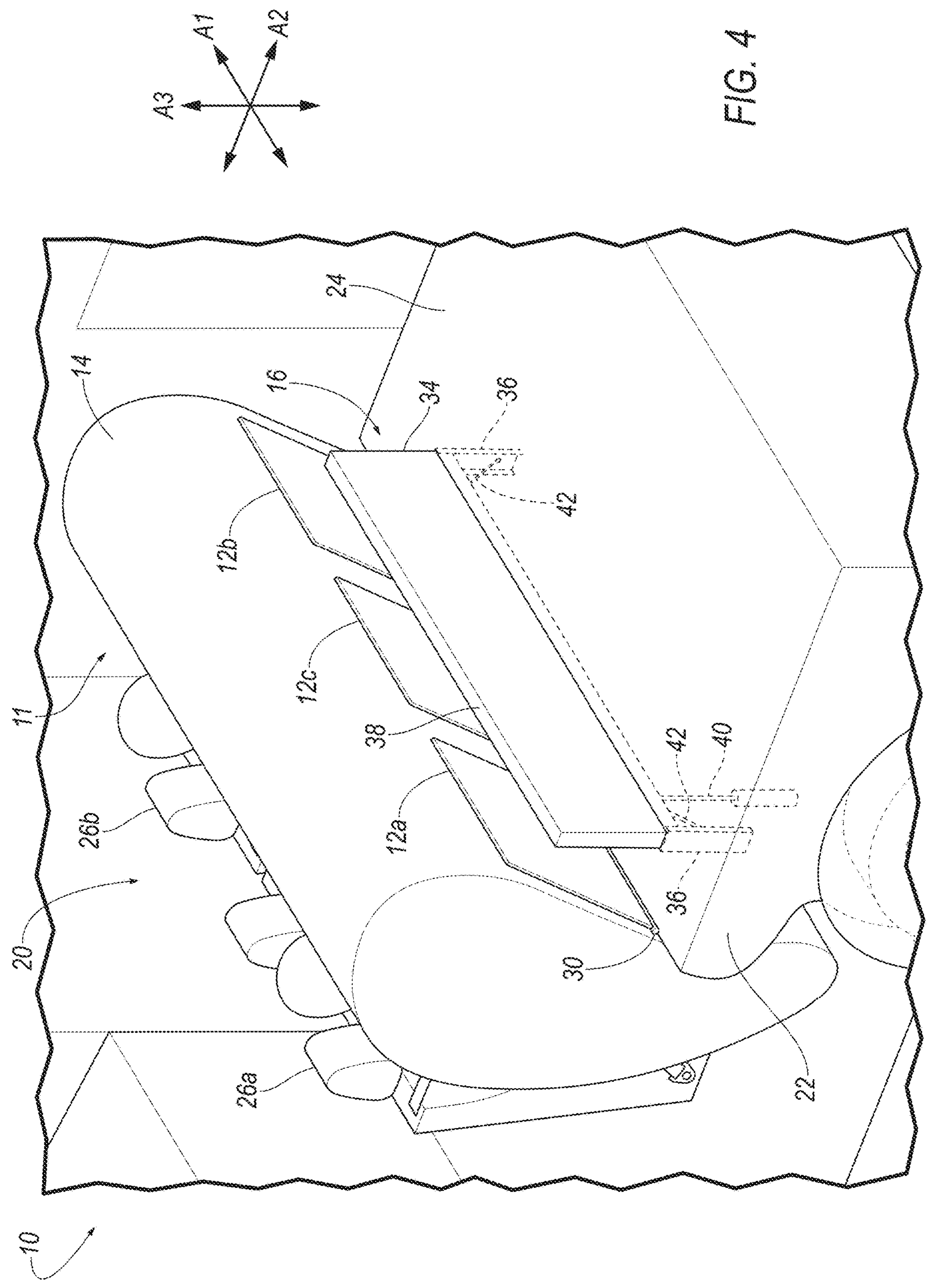
FIG. 4 another perspective view of the portion of the vehicle with the plurality of tray tables at support positions and the stop at the deployed position.

The tray table 12*a*, 12*b*, 12*c* at the support position is shown in FIGS. 3 and 4. The tray table 12*a*, 12*b*, 12*c* at the support position may provide a reaction surface for the airbag 14 in the inflated position. In other words, the tray table 12*a*, 12*b*, 12*c* at the support position may control kinematics of the airbag 14 in the inflated position during certain vehicle impacts. A "certain vehicle impact" is an impact of the type and/or magnitude for which inflation of the airbag 14 is designed, i.e., "certain" indicates the type and/or magnitude of the impact. The type and/or magnitude of such "certain vehicle impacts" may be pre-stored in a computer 32, e.g., a restraints control module and/or a body control module.

The tray table 12*a*, 12*b*, 12*c* may be upright at the support position. For example, the tray table 12*a*, 12*b*, 12*c* at the support position may extend upward from the bulkhead 22, e.g., generally along the vertical axis A3. The tray table 12*a*, 12*b*, 12*c* at the support position may be between the use position and the stowed position. For example, the tray table 12*a*, 12*b*, 12*c* may move through the support position when rotating from the stowed position to the use position, and vice versa. As another example, the use position may be on one side of the tray table 12*a*, 12*b*, 12*c* in the support position, and the stowed position may be on an opposite side of the tray table 12*a*, 12*b*, 12*c* in the support position.

The stop 16 is included in the assembly 11 to maintain the tray table 12*a*, 12*b*, 12*c* at the support position, e.g., with the stop 16 at the deployed position. For example, the stop 16 may include a wall 34 that inhibits movement of the tray table 12*a*, 12*b*, 12*c* from the support position away from the seat 26*a*, 26*b* toward the stowed position. The stop 16 may be supported by the bulkhead 22. For example, the wall 34 may be coupled to the bulkhead 22 with tracks 36 that are fixed to the bulkhead 22. The tracks 36 may control movement of the wall 34, e.g., permitting movement along the tracks 36 and inhibiting movement transverse to the tracks 36. The stop 16 may include other suitable structure (not shown) for maintaining the tray table 12*a*, 12*b*, 12*c* at the support position, e.g., a clutch, a pawl, etc. that inhibits rotation of the tray table 12*a*, 12*b*, 12*c* about the hinge 30.

During normal operation of the vehicle 10 the stop 16 may be at an undeployed position, e.g., as shown in FIGS. 1 and 2. Normal operation of the vehicle 10 includes operation of the vehicle 10 prior to detecting a certain vehicle impact. The stop 16 in the undeployed position does not restrict movement of the tray table 12*a*, 12*b*, 12*c* at the support position. For example, the stop 16 at the undeployed position may permit movement of the tray table 12*a*, 12*b*, 12*c* at the support position, e.g., rotation about the hinge 30 from the support position away from the seat 26*a*, 26*b* to the stowed position. The wall 34 at the undeployed position may be internal of the bulkhead 22. For example, a top surface 38 of the wall 34 at the undeployed position may be at or below the outer surface 24 of the bulkhead 22. The bulkhead 22 may separate the wall 34 from the occupant. The bulkhead 22 may block the wall 34 from view of the occupant. The wall 34 may be directly beneath the tray table 12*a*, 12*b*, 12*c* at the stowed position.

The stop 16 is movable from the undeployed position to the deployed position. For example, the wall 34 may slide upward along the tracks 36 from the undeployed position to the deployed position. As another example, inertia may move a pawl of the stop 16 into engagement with a gear of the stop 16 (not shown). Movement of the stop 16 from the undeployed position to the deployed position may move one or more of the tray tables 12*a*, 12*b*, 12*c* from the stowed position to the support position. For example, movement of the wall 34 may urge the tray tables 12*a*, 12*b*, 12*c* upward and cause the tray tables 12*a*, 12*b*, 12*c* to rotate about the hinge 30.

The stop 16 at the deployed position restricts movement of the tray table 12*a*, 12*b*, 12*c* at the support position, e.g., as shown in FIGS. 3 and 4. For example, the wall 34 at the deployed position may support the tray table 12*a*, 12*b*, 12*c* at the support position. The wall 34 may abut the surface 28 of the tray table 12*a*, 12*b*, 12*c* opposite the seat 26*a*, 26*b* and block rotation of the tray table 12*a*, 12*b*, 12*c* away from the support position toward the stowed position. The wall 34 at the deployed position may be external of the bulkhead 22. In other words, the bulkhead 22 may not separate the wall 34 at the deployed position from occupant. The wall 34 at the deployed position may extend upward from the bulkhead 22 away from and beyond the top of the outer surface 24 of the bulkhead 22.

The stop 16 at the deployed position may restrict movement of multiple tray tables 12*a*, 12*b*, 12*c*, e.g., movement of the first tray table 12*a*, the second tray table 12*b*, and the third tray table 12*c*, at their respective support positions. For example, the wall 34 may be elongated along the lateral axis A1 and extend from under the first tray table 12*a* under the third tray table 12*c* to under the second tray table 12*b*. The wall 34 in the deployed position may abut the first tray table 12*a*, the second tray table 12*b*, and the third tray table 12*c* in the support positions. The wall 34 in the deployed position may inhibit rotation of the first tray table 12*a*, the second tray table 12*b* and the third tray table 12*c* away from the support positions toward the stowed positions. Alternatively, multiple stops 16 may be included, e.g., one stop 16 for each tray table 12*a*, 12*b*, 12*c*. In other words, first, second, and third stops (not shown) may be included to restrict movement of the respective first, second, and third tray tables 12*a*, 12*b*, 12*c*.

The assembly 11 may include an actuator 40 operatively coupled to the stop 16 to move the stop 16 to the deployed position. The actuator 40 includes a spring, a solenoid, a motor, one or more gears, a rack and pinion, a piston and cylinder arrangement, pyrotechnic material, and/or any other suitable structure for generating sufficient force to move the stop 16, e.g., in response to a command from the computer 32. The actuator 40 may include, for example, a piston and cylinder arrangement that increases in length upon actuation. One end of the piston and cylinder arrangement may be fixed to the bulkhead 22 and an opposite end may be fixed to the wall 34 of the stop 16. The actuator 40 may be a pyrotechnic actuator. In such examples, pyrotechnic material may be disposed in the cylinder to, upon actuation, urge the piston and move the wall 34 of the stop 16 to the deployed position. Pyrotechnic material rapidly increases in volume upon actuation, e.g., in response to receiving an electrical pulse. The pyrotechnic material may be combustible to produce gas. The pyrotechnic material may be formed of a solid mixture of substances that, when ignited, react to produce the gas. For example, the pyrotechnic material may be formed of sodium azide (NaNO3), potassium nitrate (KNO3), and silicon dioxide (SiO2), which react to form nitrogen gas (N2). Additionally or alternatively, the cylinder may be in fluid communication with an inflator 44 of the airbag 14 such that inflation medium from the inflator 44 urges the piston to move the wall 34 of the stop 16. As another example, the actuator 40 may include a spring that is in compression while the wall 34 of the stop 16 is at the undeployed position, with a pin engaged with and inhibiting movement the wall 34 of the stop 16 away from the undeployed position. A solenoid may be connected to the pin. Actuation of the solenoid may disengage the pin and permit movement of the wall 34. With the pin disengaged, the spring may urge the wall 34 of the stop 16 to the deployed position. The actuator 40 may be supported by, e.g., fixed to, the bulkhead 22. The actuator 40 may be operatively coupled to the stop 16, e.g., with a fastener, linkage assembly, or other suitable structure to transfer force generated by the actuator 40 to the stop 16.

Figure 5:
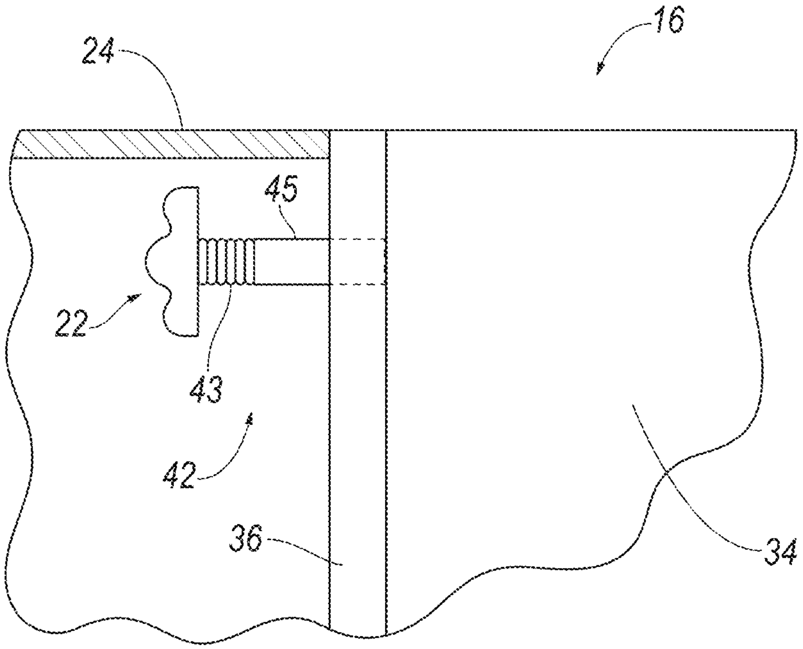
FIG. 5 is a view of a latch with the stop at the undeployed position.
Figure 6:
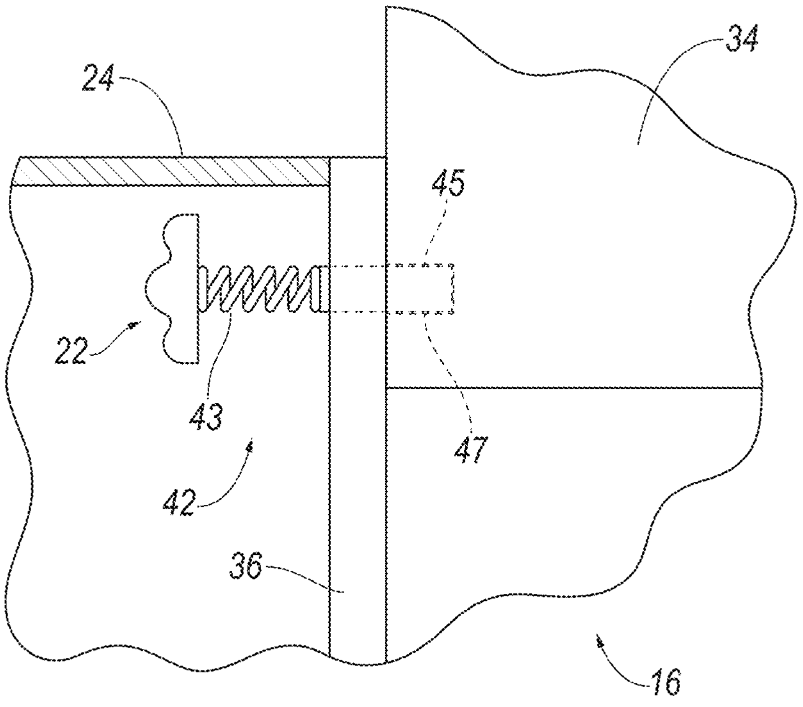
FIG. 6 is a view of the latch of FIG. 5 with the stop at the deployed position.
Figure 7:
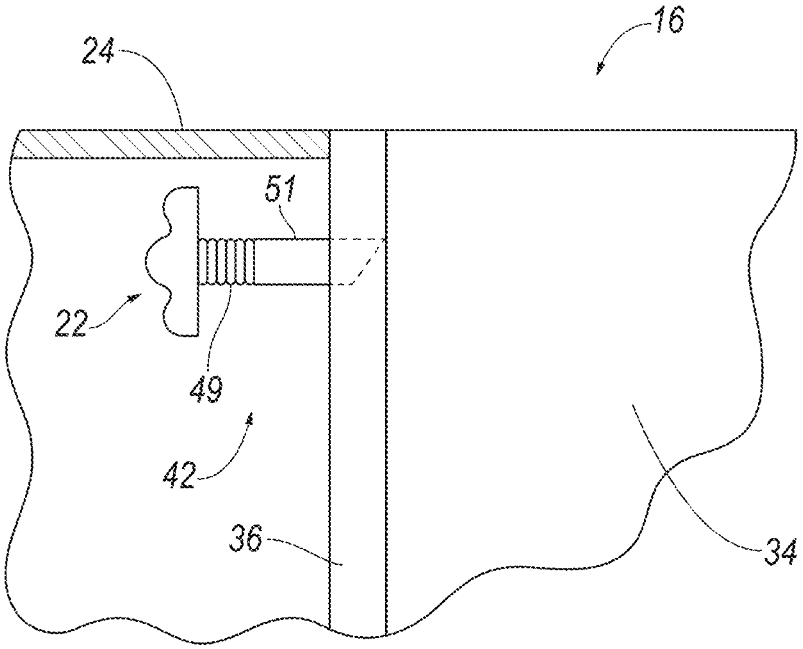
FIG. 7 is a view of another latch with the stop at the undeployed position.
Figure 8:
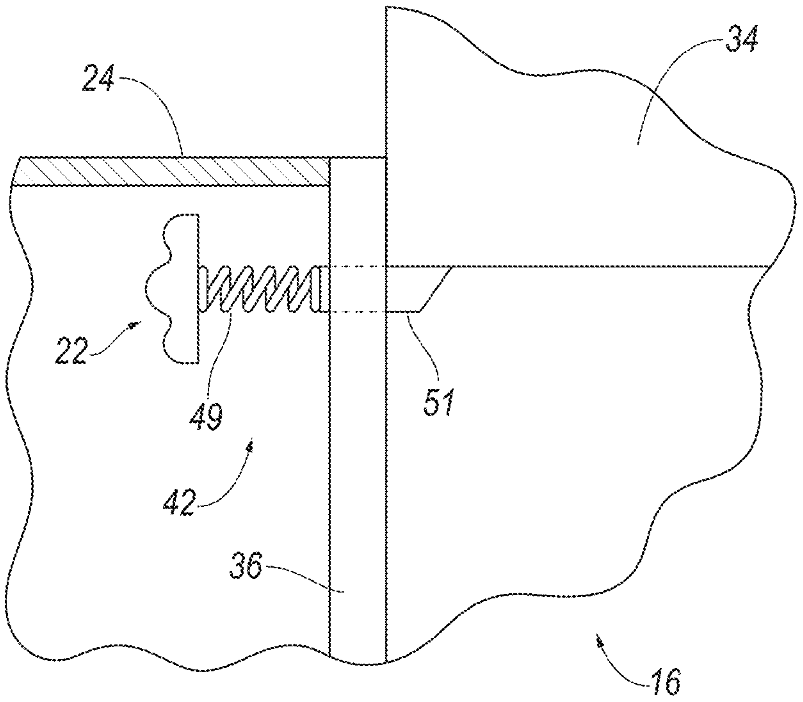
FIG. 8 is a view of the latch of FIG. 7 with the stop at the deployed position.
Figure 9:
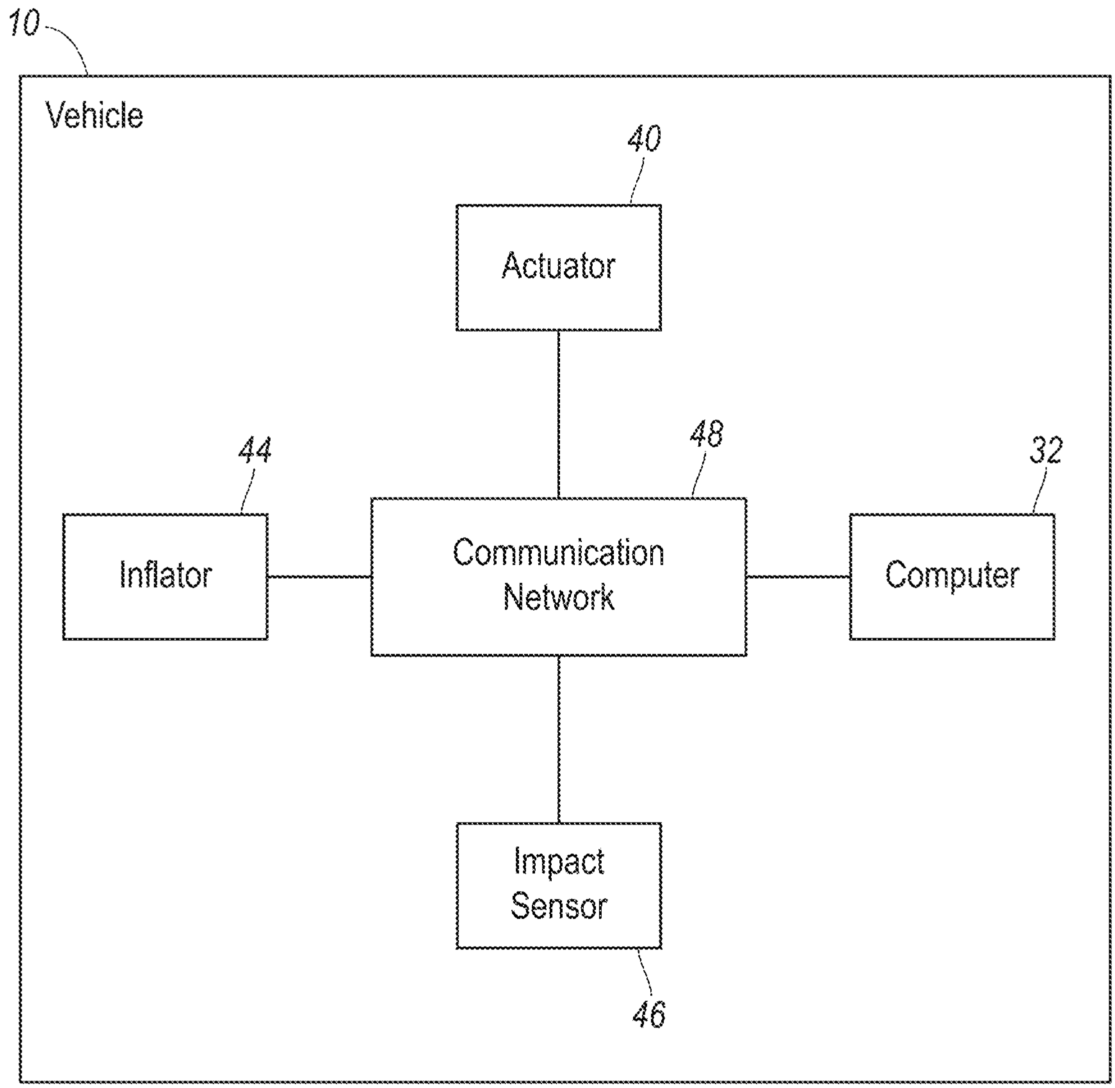
FIG. 9 is a block diagram of components of the vehicle.

The assembly 11 may include a latch 42 operable to maintain the stop 16 at the deployed position. In other words, the latch 42 prohibits movement of the stop 16 away from the deployed position and permits movement of the stop 16 from the undeployed position to the deployed position. For example, and with reference to FIGS. 5 and 6, the latch 42 may include a spring 43 that biases a pin 45 toward the wall 34. The spring 43 may be compressed between the pin 45 and a component of the bulkhead 22. The pin 45 may be adjacent to the wall 34 at the undeployed position, as shown in FIG. 5, and slide along the wall 34 as the wall 34 moves to the deployed position. The pin 45 may be engaged with a hole 47 of the wall 34 at the deployed position, as shown in FIG. 6. Engagement of the pin 45 with the hole 47 may maintain the stop 16 at the deployed position. As another example, and with reference to FIGS. 7 and 8, the latch 42 may include a spring 49 that biases a latch bolt 51 toward the wall 34. The spring 49 may be compressed between the latch bolt 51 and a component of the bulkhead 22. The latch bolt 51 may be adjacent to the wall 34 at the undeployed position, as shown in FIG. 7, and slide along the wall 34 as the wall 34 moves to the deployed position. The latch bolt 51 may be engaged directly under the wall 34 at the deployed position, as shown in FIG. 8. Engagement of latch bolt 51 directly under the wall 34 at may maintain the stop 16 at the deployed position. The latch 42 may include any other suitable structure that prohibits movement of the stop 16 away from the deployed position and permits movement of the stop 16 from the undeployed position to the deployed position.

The assembly 11 includes the airbag 14 for controlling kinematics of an occupant of the vehicle 10 during a certain vehicle impact. The airbag 14 is inflatable from an uninflated position, shown in FIGS. 1 and 2, to the inflated position, shown in FIGS. 3 and 4. The airbag 14 may include panels of a woven polymer, or any other suitable material, that define one or more inflation chambers that can receive inflation medium to inflate the airbag 14 to the inflated position. As one example, the airbag 14 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The airbag 14 may be supported by the bulkhead 22 in both the inflated position and the uninflated position. For example, the airbag 14 may be supported by an airbag housing (not shown) fixed to the bulkhead 22. The airbag 14 housing may be internal of the bulkhead 22. The airbag 14 in the uninflated position may be internal of the bulkhead 22. The airbag 14 at the uninflated position may be below the tray table 12*a*, 12*b*, 12*c*, e.g., at the use position and/or the stowed position, relative to the vertical axis A3.

The airbag 14 at the inflated position abuts the tray table 12*a*, 12*b*, 12*c* at the support position, e.g., such that the tray table 12*a*, 12*b*, 12*c* provides a reaction surface to the airbag 14. The airbag 14 at the inflated position may extend along the lateral axis A1 from the first seat 26*a* to the second seat 26*b*, e.g., to control kinematics of occupants of both seats 26*a*, 26*b*. Inflation of the airbag 14 to the inflated position may move one or more of the tray tables 12*a*, 12*b*, 12*c* from the use positions to the support positions. For example, inflation of the airbag 14 may urge the tray tables 12*a*, 12*b*, 12*c* upward and cause the tray tables 12*a*, 12*b*, 12*c* to rotate about the hinge 30. One or more tethers (not shown) may control kinematics of the airbag 14 during inflation and/or in the inflated position.

With reference to FIG. 5, the vehicle 10 may include one or more inflators 44 for inflating the airbag 14 to the inflated position. The inflator 44 is in fluid communication with the airbag 14. The inflator 44 expands the airbag 14 with inflation medium, such as a gas, to move the airbag 14 from the uninflated position to the inflated position. The inflator 44 may be supported by any suitable component. The inflator may be, for example, a pyrotechnic inflator that ignites a chemical reaction to generate the inflation medium, a stored gas inflator that releases (e.g., by a pyrotechnic valve) stored gas as the inflation medium, or a hybrid. The inflator may be, for example, at least partially in the inflation chamber to deliver inflation medium directly to the inflation chamber or may be connected to the inflation chamber through fill tubes, diffusers, etc. The inflator 44 may be supported by the bulkhead 22, e.g., fixed to the bulkhead 22 via fastener, bracket, etc.

The vehicle 10 may include at least one impact sensor 46 for sensing certain vehicle impacts (e.g., impacts of a certain magnitude, direction, etc.), and the computer 32 in communication with the impact sensor 46 and the inflator 44. The computer 32 may activate the inflator 44, e.g., provide an impulse to a pyrotechnic charge of the inflator 44 when the impact sensor 46 senses certain vehicle impacts. The impact sensor 46 may be configured to sense certain vehicle impacts prior to impact, i.e., pre-impact sensing. The impact sensor 46 may be in communication with the computer 32. The impact sensor 46 is configured to detect certain vehicle impacts. In other words, a "certain vehicle impact" is an impact of the type and/or magnitude for which inflation of the airbag 14 is designed i.e., "certain" indicates the type and/or magnitude of the impact. The type and/or magnitude of such "certain vehicle impacts" may be pre-stored in the computer 32, e.g., a restraints control module and/or a body control module. The impact sensor 46 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor 46 may be located at numerous points in or on the vehicle 10.

The vehicle 10 may include a communication network 48. The communication network 48 includes hardware, such as a communication bus, for facilitating communication among components of the vehicle 10, e.g., the computer 32, the actuator 40, the inflator 44, the impact sensor 46, etc. The communication network 48 may facilitate wired or wireless communication among the vehicle 10 components in accordance with a number of communication protocols such as controller area network (CAN), Ethernet, WiFi, Local Interconnect Network (LIN), and/or other wired or wireless mechanisms. Alternatively or additionally, in cases where the computer 32 comprises a plurality of devices, the communication network 48 may be used for communications between devices represented as the computer 32 in this disclosure.

The computer 32 may be a microprocessor-based computer implemented via circuits, chips, or other electronic components. The computer 32 includes a processor, a memory, etc. The memory of the computer 32 may include memory for storing programming instructions executable by the processor as well as for electronically storing data and/or databases. For example, the computer 32 can be a generic computer with a processor and memory as described above and/or may include an electronic control unit (ECU) or controller for a specific function or set of functions, and/or a dedicated electronic circuit including an ASIC that is manufactured for a particular operation, e.g., an ASIC for processing sensor data and/or communicating the sensor data. As another example, the computer 32 may be a restraints control module. In another example, computer 32 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 32. The memory can be of any type, e.g., hard disk drives, solid state drives, servers, or any volatile or non-volatile media. The memory can store the collected data sent from the sensors.

The computer 32 is in communication with the actuator 40, the impact sensor 46, and the inflator 44, e.g., via the communication network 48.

The computer 32 is programmed to, i.e., the memory stores instructions executable by the processor to, inflate the airbag 14 to the inflated positions. The computer 32 may inflate the airbags 14 by commanding a pulse to the inflator 44, e.g., via the communication network 48.

In examples in which the actuator 40 is controllable by the computer 32, e.g., in examples in which the actuator 40 is a solenoid, piston, motor, etc., the computer 32 is programmed to command the actuator 40 to move the stop 16 to the deployed position. The computer 32 may command the actuator 40, e.g., by transmitting a pulse, electrical signal, or the like to the actuator 40 via the communication network 48. The command may cause activation of pyrotechnic material, trigger the solenoid to move the pin, etc.

The computer 32 is programmed to detect a certain impact to the vehicle 10. The computer 32 may detect certain impacts to the vehicle 10 based on information received from the impact sensors 46, e.g., received via the communication network 48. The computer 32 may inflate the airbag 14 and command the actuator 40 to move the stop 16 to the deployed position in response to detecting a certain vehicle impact. In other words, the computer may inflated the airbag and move the stop to the deployed position upon detection of a certain vehicle impact.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. Operations, systems, and methods described herein should always be implemented and/or performed in accordance with an applicable owner's/user's manual and/or safety guidelines.

The numerical adjectives "first," "second," etc., are used herein merely as identifiers and do not signify order or importance. Use of "in response to," "based on," and "upon" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An assembly, comprising:

a bulkhead;

a tray table rotatable relative to the bulkhead from a use position to a support position;

an airbag inflatable to an inflated position, the airbag at the inflated position abutting the tray table at the support position;

a stop movable from an undeployed position to a deployed position;

the stop including a wall internal to the bulkhead at the undeployed position, the wall translating upwardly from the undeployed position to the deployed position and extending upward from the bulkhead at the deployed position;

the wall being spaced from the tray table at the undeployed position; and the wall abutting the tray table at the support position to restrict rotation of the tray table at the support position.

2. The assembly of claim 1, wherein the tray table is supported by the bulkhead.

3. The assembly of claim 2, wherein the stop is supported by the bulkhead.

4. The assembly of claim 3, wherein the airbag is supported by the bulkhead.

5. The assembly of claim 1, wherein the airbag at the uninflated position is below the tray table at the use position.

6. The assembly of claim 1, wherein the stop in the undeployed position does not restrict movement of the tray table at the support position.

7. The assembly of claim 1, wherein the wall at the deployed position supports the tray table at the support position.

8. The assembly of claim 1, wherein the tray table at the support position is between the use position and the stowed position.

9. The assembly of claim 1, wherein the tray table is rotatable from the stowed position to the use position and rotatable from use position to the stowed position.

10. The assembly of claim 1, further comprising an actuator operatively coupled to the stop to move the stop to the deployed position.

11. The assembly of claim 10, further comprising a computer in communication with the actuator, the computer programmed to command the actuator to move the stop to the deployed position in response to detecting a certain vehicle impact.

12. The assembly of claim 1, further comprising a seat, the tray table at the use position usable by an occupant of the seat.

13. The assembly of claim 1, wherein the tray table is upright at the support position.

14. The assembly of claim 1, further comprising:

a second tray table movable to a support position;

the stop including a wall extending from the tray table to the second tray table at the deployed position to restrict movement of the second tray table at the support position.

15. The assembly of claim 1, further comprising a latch operable to maintain the stop at the deployed position.

* * * * *